Jan. 16, 1923.
W. T. LINDSAY ET AL.
SPOTLIGHT BRACKET.
FILED FEB. 26, 1921.
1,442,411.
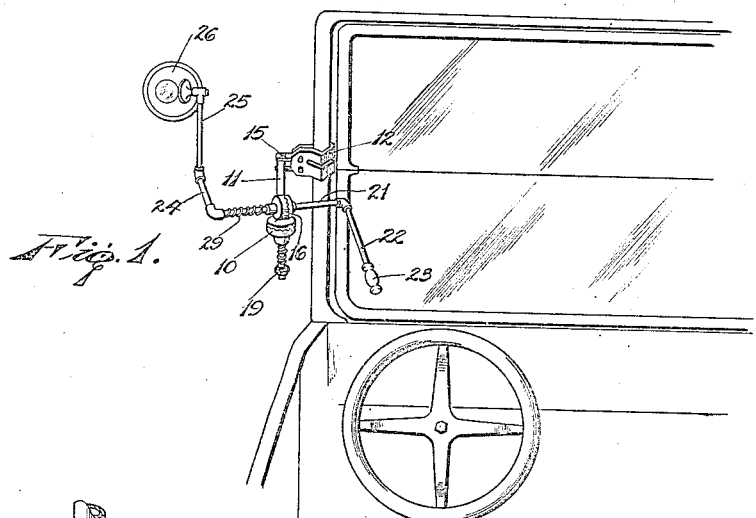
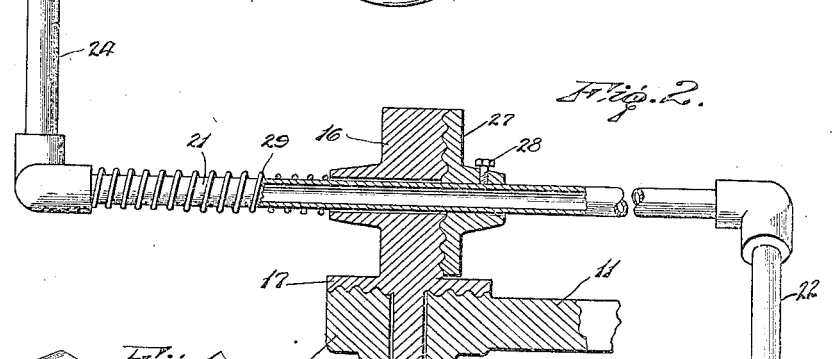
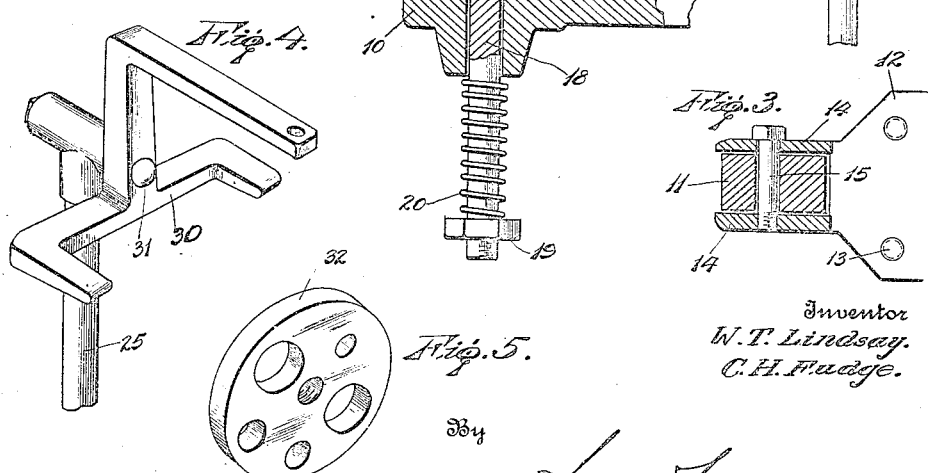
Inventor
W. T. Lindsay.
C. H. Fudge.
By
Lacey & Lacey, Attorneys Patented Jan. 16, 1923.

1,442,411

UNITED STATES PATENT OFFICE.

WILLIAM T. LINDSAY AND CHARLES H. FUDGE, OF CHATTANOOGA, TENNESSEE.

SPOTLIGHT BRACKET.

Application filed February 26, 1921. Serial No. 447,956.

*To all whom it may concern:*

Be it known that we, WILLIAM T. LINDSAY and CHARLES H. FUDGE, citizens of the United States, residing at Chattanooga, in the county of Hamilton and State of Tennessee, have invented certain new and useful Improvements in Spotlight Brackets, of which the following is a specification.

This invention relates to an improved spotlight bracket for motor vehicles and has as one of its principal objects to provide a device of this character whereby a spotlight may be quickly and conveniently adjusted from the driver's seat.

The invention has as a further object to provide a device wherein the spotlight may be adjusted both vertically and horizontally so that the spotlight may be turned to practically any angle desired.

And the invention has as a still further object to provide a device which may be employed in connection with motor vehicles of substantially any conventional design.

Other and incidental objects will appear hereinafter.

In the drawings:

Figure 1 is a fragmentary perspective view showing our improved bracket in connection with a motor vehicle of conventional design, Figure 2 is an enlarged fragmentary section particularly illustrating the clutch members of the device, parts being shown in elevation, Figure 3 is a detail section through the joint of the main supporting clamp.

Figure 4 is a perspective view showing an attachment for use in connection with the bracket, and Figure 5 is a perspective view showing another attachment for use in connection with the bracket.

In carrying the invention into effect, we employ an annular supporting head 10 from which extends an arm 11. At its inner end, this arm is swingingly connected to a clamp 12 which, as best shown in Figures 1 and 3 of the drawings, is formed of mating clamp members adjustably connected by bolts or other suitable fastenings 13. Extending from one of the clamp members are lugs 14 between which the end of the arm 11 remote from the head 10 is freely received, and extending through said lugs and through the arm is a pivot bolt 15. In the drawings, we have shown our improved device in connection with a motor vehicle of conventional design and, as suggested, the clamp 12 may be engaged with the frame of the wind shield of the vehicle for securing the bracket thereto. Journaled upon the supporting head is a compound clutch element comprising an annular clutch member 16 upon the lower side of which is integrally formed an annular clutch member 17 lying at substantially right angles to the former member, and extending from the member 17 is a stem or shank 18. This stem is preferably integral with the clutch members and is journaled through the head 10 for supporting the clutch element thereon. Threaded upon the lower end portion of the stem is a nut 19 and bearing between said nut and the head is a spring 20. As will be appreciated, this spring will serve to hold the member 17 against the head 10 and, as best shown in Figure 2, the head and said member are formed with corrugated coacting faces. The nut may, of course, be adjusted for tensioning the spring.

Journaled through the clutch member 16 at substantially right angles to the stem 18, is a lamp supporting shaft 21 to the inner end of which is connected a laterally directed handle 22 extending rearwardly toward the driver's seat of the vehicle and provided with a grip 23. Connected to the outer end of said shaft is a forwardly directed arm 24 lying in a plane with said handle and upstanding from the arm 24 is a post 25. This post is designed to carry a spotlight as conventionally illustrated at 26. Adjustable along the shaft 21 is a clutch member or collar 27 held in adjusted position by a set screw 28 and bearing between the clutch member 16 and the elbow at the outer end of the shaft 21 is a spring 29. This spring will, of course, hold the collar 27 against the member 16 and, as shown in Figure 2, these elements are formed with coacting corrugated faces. Tension upon the spring may be varied by adjustably positioning the collar.

As will now be readily understood in view of the preceding description, the bracket may be swung bodily upon the pivot bolt 15 for positioning the rear end of the handle either toward or away from the driver's seat when said bolt may be tightened for locking the bracket in adjusted position. Accordingly, the handle 23 may be brought within convenient reach. The spotlight may then be adjusted horizontally by simply swinging the handle 22 laterally. When this is done the stem 18 will, of course, rotate upon the supporting head 10 while the clutch member 17 will coact with the head for locking the spotlight in adjusted position. By raising or lowering the handle 22, the spotlight may be adjusted vertically. When the handle is thus raised or lowered, the shaft 21 will rotate upon the member 16 while the clutch collar 27 will coact with said member for locking the spotlight in adjusted position. It will accordingly be seen that the spotlight may be readily manipulated and may be turned to practically any angle desired.

In order that spot lights of different shapes may be employed in connection with our improved bracket, we have provided different types of holders in conjunction with the bracket. One of these holders is shown at 30 in Figure 4. As will be observed, the holder is connected to the post 25 of the bracket by a bolt 31 and is designed to support a spotlight upon the post. In Figure 5, a holder 32 of disc shape is shown. This holder 32 may be connected to the post 25, in lieu of the holder 30, by the bolt 31, the bolt being passed through the central opening of the disc while the disc is provided with several other openings of different sizes so as to accommodate different sized supporting studs of different spot lights.

Having thus described the invention, what is claimed as new is:

1. A light bracket for motor vehicles including a supporting head, a clutch member pivotally mounted thereon and provided with two clutch faces located in intersecting planes, one of said clutch faces being presented to the head, means co-operating with the head and the clutch face presented thereto to hold the clutch member in a set position relative to the head, a lamp-carrying shaft extending through the clutch member and rotatable therein, and means carried by the shaft and co-operating with the second clutch face to hold the shaft in a set position relative to the clutch member.

2. A light bracket for motor vehicles including a supporting head, a clutch member having a stem extending through and rotatable in the head, said clutch member having a clutch face presented to the head and a second clutch face at an angle to the first clutch face, a spring carried by the stem and bearing upon the head to hold the clutch member in frictional engagement with the head in a set position, means for variably tensioning said spring, a lamp-carrying shaft extending through and rotatable in said member at substantially right angles to said stem, and means carried by the shaft to coact with the second clutch face of the clutch member to hold the shaft in a set position.

3. A light bracket for motor vehicles including a supporting head, a clutch member pivotally mounted thereon, a lamp-carrying shaft extending through said member and rotatable therein, a second clutch member carried by the shaft, and a spring bearing between an abutment on the shaft and the first clutch member for holding the second clutch member in engagement with the first clutch member, the second clutch member being adjustable longitudinally of the shaft for tensioning the spring.

4. A light bracket for motor vehicles comprising a supporting head, a clutch member bearing against one side of the head and having a stem extending through and rotatable in the head, means for retaining the stem in the head and holding the clutch member in frictional engagement with the head in a set position, a second clutch member projecting from the first clutch member in substantial alinement with the stem, a lamp-carrying shaft extending through the second clutch member across the plane of the stem and rotatable in the second clutch member, a clutch collar adjustable longitudinally on the lamp-carrying shaft and adapted to frictionally engage one side of the second clutch member, and means on the shaft at the opposite side of the second clutch member to maintain the engagement between the second clutch member and the clutch collar whereby to hold the shaft in a set position.

In testimony whereof we affix our signatures.

WILLIAM T. LINDSAY. [L. S.]
CHARLES H. FUDGE. [L. S.]